(12) United States Patent
Hama (10) Patent No.: US 6,885,485 B2
(45) Date of Patent: Apr. 26, 2005

(54) MULTIBEAM SCANNING DEVICE (75) Inventor: Yoshihiro Hama, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/807,193

(22) Filed: Mar. 24, 2004

(65) Prior Publication Data
US 2004/0190098 A1 Sep. 30, 2004

(30) Foreign Application Priority Data

Mar. 25, 2003 (JP) ........................................ 2003-082079

(51) Int. Cl.⁷ ............................................. G02B 26/08
(52) U.S. Cl. ..................... 359/204; 359/209; 359/210; 359/212; 359/216; 359/226
(58) Field of Search ................................ 359/204–223, 359/226; 347/243, 244

(56) References Cited

U.S. PATENT DOCUMENTS

| | | | |
|---|---|---|---|
| 5,181,137 A | | 1/1993 | Koide |
| 5,828,479 A | * | 10/1998 | Takano et al. .............. 359/201 |
| 6,734,890 B2 | | 5/2004 | Takeuchi et al. |
| 2004/0184127 A1 | * | 9/2004 | Nakajima et al. |

FOREIGN PATENT DOCUMENTS

| | | |
|---|---|---|
| JP | 2-58015 | 2/1990 |
| JP | 9-90187 | 4/1997 |
| JP | 10-133131 | 5/1998 |
| JP | 10-268217 | 10/1998 |
| JP | 2002-182145 | 6/2002 |
| JP | 2003-5113 | 1/2003 |

OTHER PUBLICATIONS

English Language Abstract of JP 2002–182145.
English Language Abstract of JP 9–90187.

* cited by examiner

Primary Examiner—James Phan
(74) Attorney, Agent, or Firm—Greenblum & Bernstein, P.L.C.

(57) ABSTRACT

A multibeam scanning device includes a deflecting system that deflects a plurality of beams, which are emitted by a light source, in a main scanning direction. On a first imaging optical system, the dynamically deflected beams are incident. A plurality of optical path deflection units deflect the optical paths of the optical beams passed through the first imaging optical system, respectively. Each of the plurality of optical path deflection units is capable of varying the deflection direction of the beam in the auxiliary scanning direction. A plurality of second imaging optical systems converge the beams deflected by the deflection units on target surfaces, respectively. A position adjusting system is provided to adjust a position of each of the second imaging optical systems so that the positional relationship of the second imaging optical system with respect to the beam incident thereon is maintained.

13 Claims, 4 Drawing Sheets

MULTIBEAM SCANNING DEVICE

BACKGROUND OF THE INVENTION

The present invention relates to a multibeam scanning device for dynamically deflecting a plurality of beams to simultaneously scan on corresponding target surfaces.

Various types of multibeam scanning devices for simultaneously scanning a plurality of optical beams on corresponding scan target surfaces respectively (the so-called "tandem multibeam scanning devices") have been proposed and brought into practical use today. Such tandem multibeam scanning devices are installed in a wide range of image formation devices such as laser printers, copy machines and facsimile machines.

In such devices, electrostatic latent images corresponding to particular colors are formed on a plurality of scan target surfaces (surfaces of photoconductive drums, etc.) respectively by the multibeam scanning device, which simultaneously scans a plurality of optical beams on the scan target surfaces, respectively. The electrostatic latent images formed on the scan target surfaces are developed by a plurality of developing units for the colors, respectively, and the developed images of the colors are successively transferred to a print medium (paper, etc.) and superposed on one another, by which a color image is formed on the print medium.

The multibeam scanning device typically includes an fθ lens having fθ characteristics, a plurality of mirrors placed on optical paths of the optical beams for deflecting the optical paths, a plurality of cylindrical lenses placed on the optical paths having refractive power for converging the optical beam (laser beam) in the auxiliary scanning direction while correcting various aberrations (e.g., fθ characteristics errors and field curvature (curvature of field, image surface curvature) in the main scanning direction), etc. There is a tendency in recent years toward the reduction of the number of optical elements for reducing costs, and multibeam scanning devices using only one deflecting system (e.g. polygon mirror) and only one fθ lens, to share each component among the colors, have become popular.

In such multibeam scanning devices, a plurality of optical beams are incident upon a reflecting surface of the polygon mirror at different incident angles in the auxiliary scanning direction. The optical beams dynamically deflected by the reflecting surface of the polygon mirror then pass through the fθ lens at different positions in the auxiliary scanning direction. In this case, there exists an optical beam that travels apart from the optical axis of the fθ lens (as an optical system in the device). The misalignment of the optical beam from the optical axis of the optical system causes a scan line formed on the scan target surface by the optical beam traveling through the optical system (apart from the optical axis) to become a curved or distorted line, which is called "bow," due to distortion caused by the optical system.

Since the optical beams travel at different image heights in the fθ lens, the degree of distortion of the bow differs among the optical beams. If the "bows" of the scan lines occur, each image formed on the scan target surface is distorted and thereby image quality is deteriorated. The image quality is further deteriorated in the color superposition since the images of the colors are not superposed on one another precisely (misregistration). To avoid the problems, the bow on the scan target surface is corrected generally by placing each cylindrical lens (placed on the image side of the fθ lens) eccentrically, that is, by slightly shifting the position of each cylindrical lens in the auxiliary scanning direction relative to the incident optical beam.

In the formation of a color image by such a tandem multibeam scanning device, there still exists a phenomenon other than the bow that deteriorates the image quality: a shift of scan lines in the auxiliary scanning direction. If the shift of scan lines in the auxiliary scanning direction occurs, image quality is deteriorated by the shift of each image formed on each scan target surface and then further deteriorated by the misregistration occurring in the color superposition. In order to avoid the problems, the shift of scan lines in the auxiliary scanning direction is corrected generally by adjusting the angle of each mirror placed between the fθ lens and each cylindrical lens.

However, if the angle of the mirror is adjusted depending on the shift of the scan line occurring in the auxiliary scanning direction, the optical path of the optical beam is changed and thereby the bow revives on the scan target surface. Therefore, in conventional techniques, the bow was corrected by changing curvature characteristics of the cylindrical lens by deforming and curving the cylindrical lens. An example of such a configuration is disclosed in Japanese Patent Provisional Publication No. HEI10-268217 (pages 2–4, FIGS. 1, 5 and 6).

However, such adjustment deforming and curving the cylindrical lens is a complex and troublesome task for factory workers and the workers are required to be trained and skillful. Further, deforming the optical element by external force might deteriorate optical characteristics of the optical element itself. Such a method of deforming each cylindrical lens increases the number of necessary steps in the manufacturing process, elongates assembly time of the multibeam scanning device, drives up the manufacturing costs, and causes deterioration of images formed by the device.

SUMMARY OF THE INVENTION

The present invention is advantageous in that an improved multibeam scanning device is provided. The multibeam scanning device as provided is capable of generating excellent color images without increasing the load on factory workers in the manufacturing process and without causing deterioration of optical characteristics of the optical elements.

According to an aspect of the invention, there is provided a multibeam scanning device, which dynamically deflects a plurality of light beams emitted by a light source. The dynamically deflected optical beams are scanned on target surfaces, respectively. The multibeam scanning device is provided with a deflecting system that deflects the plurality of beams emitted by the light source in a main scanning direction, the plurality of beams being aligned in the main scanning direction, a first imaging optical system upon which all the optical beams dynamically deflected by the deflecting system are incident, a plurality of optical path deflection units each of which deflects the optical path of each of the optical beams that passed through the first imaging optical system, each of the plurality of optical path deflection units being rotatable in the auxiliary scanning direction that is orthogonal to the main scanning direction, a plurality of second imaging optical systems, the plurality of beams deflected by the optical path deflection units being incident on the plurality of second imaging optical systems, respectively, the beams passed through the second imaging optical systems being converged on the plurality of target surfaces, respectively, and a position adjusting system which adjusts a position of each of the plurality of second imaging optical systems so that the positional relationship of the second imaging optical system with respect to the beam incident thereon is maintained.

Optionally, the position adjusting system may include a plurality of moving mechanisms that move the plurality of second imaging optical systems in association with rotation of the plurality of optical path deflection units, respectively.

In a particular case, each of the moving mechanisms may be configured to move each of the second imaging optical systems in conjunction with the corresponding optical path deflection unit maintaining a constant distance with respect to the corresponding optical path deflection unit.

In this case, the moving mechanisms may include link systems which connect the second imaging optical systems with the corresponding optical path deflection units so that the plurality of second imaging optical systems move according to rotation of the optical path deflection units, respectively.

Further optionally, the link system may be formed to let the second imaging optical system rotate around the corresponding optical path deflection unit by twice rotation angle of the corresponding optical path deflection unit.

In a particular example, each of the moving mechanisms may be configured such that a deflection point of the optical beam on the optical path deflection unit, a rotation axis of the optical path deflection unit, and a rotation axis of the corresponding second imaging optical system coincide with one another.

Optionally, the device may include a plurality of aperture units corresponding to the second imaging optical systems, each of the plurality of aperture units regulating and specifying a shape of a beam spot formed on each of the scan target surfaces, the aperture unit being placed so as not to move relative to the corresponding second imaging optical system.

Further, each of the second imaging optical systems may be formed to have a concavity on its beam incident side, and each of the aperture units may be fitted in the concavity of the corresponding second imaging optical system.

In a certain case, the first imaging optical system may include an fθ lens. In this case, each of the second imaging optical systems may include an optical system having refracting power to converge the optical beam in the auxiliary scanning direction.

Further optionally, the plurality of second imaging optical systems may be configured to compensate for aberration caused by the first imaging system for the plurality of beams when predetermined positional relationships with respect to the plurality of beams are maintained, and the position adjusting system adjusts a position of each of the plurality of second imaging optical systems so that the predetermined positional relationship of the second imaging optical system with respect to the beam incident thereon is maintained.

According to a further aspect of the invention, there is provided a multibeam scanning device that dynamically deflects a plurality of light beams emitted by a light source, the dynamically deflected optical beams being scanned on target surfaces, respectively. The scanning device may include a deflecting system that deflects the plurality of beams emitted by the light source in a main scanning direction, the plurality of beams being aligned in the main scanning direction, a first imaging optical system upon which all the optical beams dynamically deflected by the deflecting system are incident, a plurality of optical path deflection units each of which deflects the optical path of each of the optical beams that passed through the first imaging optical system in the auxiliary scanning direction that is orthogonal to the main scanning direction, a direction in which each of the plurality of beams is deflected being changeable. Further provided are a plurality of second imaging optical systems, the plurality of beams deflected by the optical path deflection units being incident on the plurality of second imaging optical systems, respectively, the beams passed through the second imaging optical systems being converged on the plurality of target surfaces, respectively, and a position adjusting system which adjusts a position of each of the plurality of second imaging optical systems so that the positional relationship of the second imaging optical system with respect to the beam incident thereon is maintained.

According to another aspect of the invention, there is provided a multibeam scanning device that dynamically deflects a plurality of light beams emitted by a light source, the dynamically deflected optical beams being scanned on target surfaces, respectively. The scanning device may include first deflection means for deflecting the plurality of beams emitted by the light source in a main scanning direction, the plurality of beams being aligned in the main scanning direction, a first imaging optical system upon which all the optical beams dynamically deflected by the first deflection means are incident, a plurality of second deflection means for deflecting the optical paths of the optical beams that passed through the first imaging optical system individually in the auxiliary scanning direction that is orthogonal to the main scanning direction, a plurality of second imaging optical systems, the plurality of beams deflected by the second deflection means being incident on the plurality of second imaging optical systems, respectively, the beams passed through the second imaging optical systems being converged on the plurality of target surfaces, respectively, and adjusting means for adjusting positions of each of the plurality of second imaging optical systems so that the positional relationships of the plurality of second imaging optical systems with respect to the beams incident thereon are maintained, respectively.

DESCRIPTION OF THE EMBODIMENTS

Referring now to the drawings, a description will be given in detail of preferred embodiments in accordance with the present invention.

Figure 1:
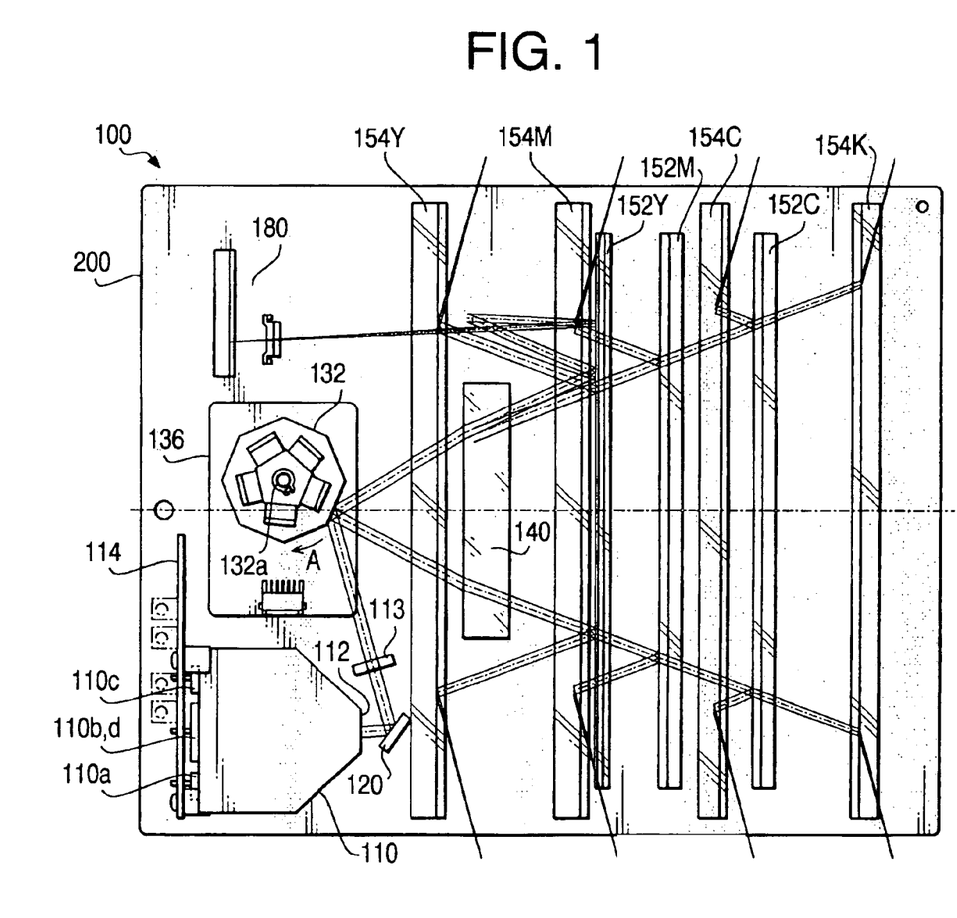
FIG. 1 is a schematic diagram showing the composition of a multibeam scanning device in accordance with an embodiment of the present invention.

FIG. 1 is a schematic diagram showing the composition of a multibeam scanning device 100 in accordance with a first embodiment of the present invention. The multibeam scanning device 100 is the so-called tandem multibeam scanning device forming images on a plurality of scan target surfaces (e.g., surfaces of photoconductive drums) by simultaneously scanning a plurality of optical beams on the scan target surfaces, respectively. The multibeam scanning device 100 can be installed in a variety of image formation devices such as laser printers, copy machines and facsimile machines. The image formation device equipped with the multibeam scanning device 100 according to this embodiment forms a color image by developing electrostatic latent images formed on the scan target surfaces by use of developing units of different colors (e.g., yellow, magenta, cyan and black) and successively transferring the developed images to a print medium (paper, etc.) so that the images will be superposed on one another.

Figure 2:
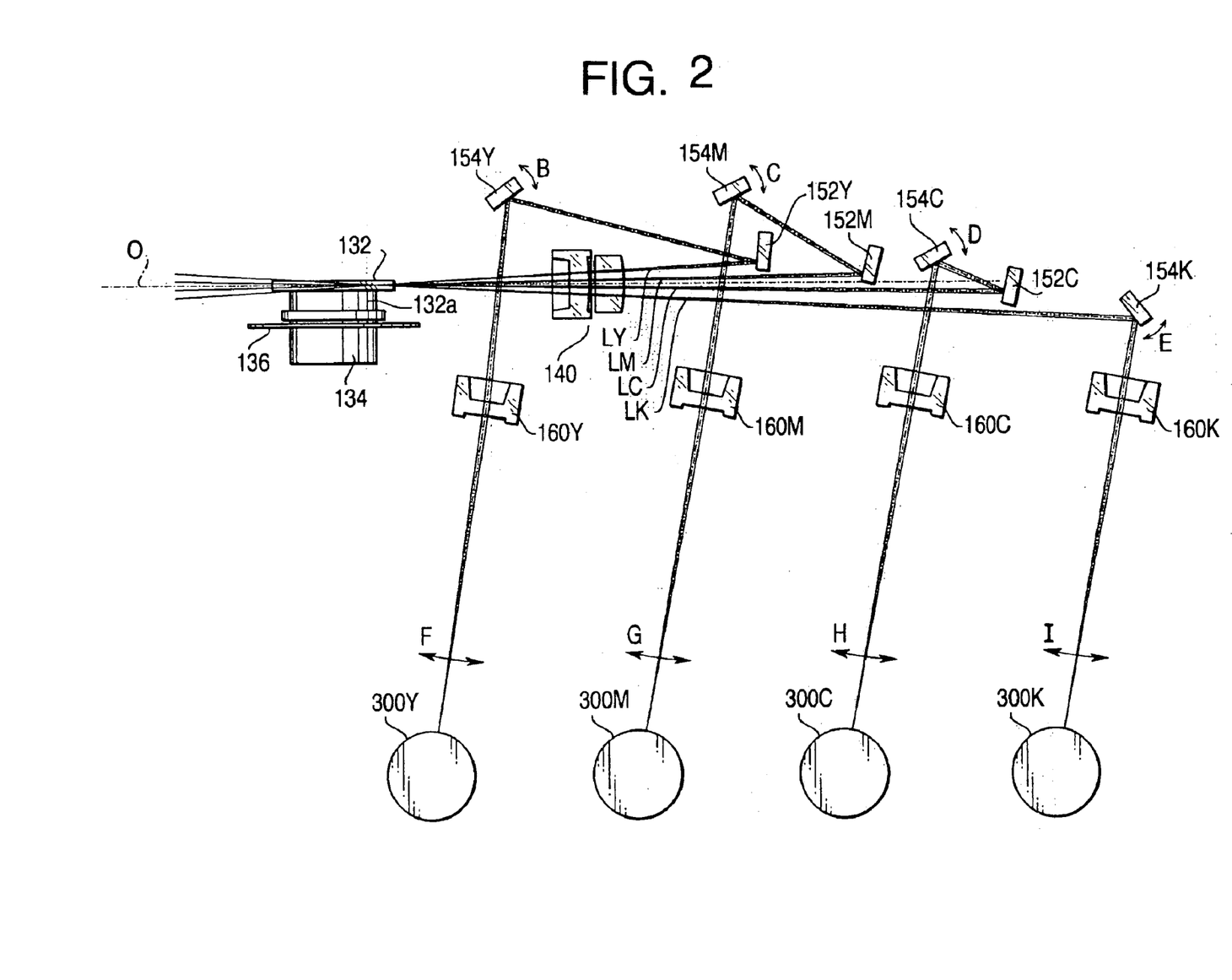
FIG. 2 is a schematic diagram showing part of the composition of the multibeam scanning device shown in FIG. 1 when viewed from its side.

FIG. 1 views the whole multibeam scanning device 100 from its top omitting a cover on top of a housing 200 (exterior frame) of the device 100 for clear understanding of the composition of the device 100. FIG. 2 is a schematic diagram showing part of the composition of the multibeam scanning device 100 of this embodiment viewed from its side. In the following, the composition and operation of the multibeam scanning device 100 will be described in detail referring to FIGS. 1 and 2.

The multibeam scanning device 100 includes a light source unit 110 for emitting a plurality of optical beams to be scanned on the scan target surfaces. The light source unit 110 is equipped with four laser diodes 110a, 110b, 110c and 110d as the light emitting elements.

Each laser diode 110a–110d oscillates in the same frequency to emit an optical beam of the same wavelength having an elliptical sectional form orthogonal to its axial direction. The laser diodes 110a–110d are mounted on a control circuit board 114 which drives and controls ON/OFF modulation of the laser diodes 110a–110d. The light source unit 110 is held on the control circuit board 114, and the control circuit board 114 is supported by unshown supports formed at the bottom of the housing 200. In short, the laser diodes 110a–110d are substantially supported by the housing 200. In this embodiment, the scan target surfaces mean the surfaces of four photoconductive drums 300Y, 300M, 300C and 300K for four colors (yellow, magenta, cyan and black), respectively.

The optical beams emitted by the laser diode 110a–110d respectively are collimated into parallel light beams by unshown collimator lenses placed on their optical paths in the light source unit 110. The collimated optical beams are deflected by unshown deflection mirrors placed on their optical paths in the light source unit 110 and are emitted from an outlet 112 of the light source unit 110 being perfectly overlapped with one another in the main scanning direction and evenly and parallely arranged in the auxiliary scanning direction. In this specification, the direction of the scanning of each optical beam on each scan target surface is called "main scanning direction", and a direction orthogonal to the main scanning direction is called "auxiliary scanning direction". The "main scanning direction" is defined not only on the scan target surface but also at any point on the optical path of the optical beam, as a direction regarding the main scan of the optical beam, that is, the direction in which the optical beam is dynamically deflected by the polygon mirror 132 or the direction in which the optical beam moves according to the revolution of the polygon mirror 132. The "auxiliary scanning direction" is also defined at any point on the optical path of the optical beam as a direction orthogonal to the main scanning direction.

As mentioned above, each optical beam emitted from the outlet 112 of the light source unit 110 has an elliptical sectional form orthogonal to its axial direction, with its major axis in a direction parallel to the plane of FIG. 1 and with its minor axis substantially orthogonal to the plane of FIG. 1. The optical beams emerging from the outlet 112 are deflected by a deflection mirror 120 and guided to a cylindrical lens 113.

The cylindrical lens 113 has refractive power for converging and focusing each optical beam only in the auxiliary scanning direction in the vicinity of a reflecting surface of a polygon mirror 132 which will be described below. Therefore, each optical beam is changed its power in the minor axis direction (without being changed its power in the major axis direction) by the cylindrical lens and focuses (in the auxiliary scanning direction) in the vicinity of the reflecting surface of the polygon mirror 132. Further, all the optical beams incident on the cylindrical lens 113 are parallel with each other, the beams emerged from the cylindrical lens 113 are directed to a focal position of the cylindrical lens, i.e., all the beams emerged from the cylindrical lens 113 focus on substantially the same position in the vicinity of the reflecting surface of the polygon mirror 132. In other words, the optical beams at different incident angles are incident upon the same position in the vicinity of the reflecting surface of the polygon mirror 132 and focused (in the auxiliary scanning direction) at the position.

The polygon mirror 132 is revolved around its rotation axis 132a by a motor 134 at a constant speed in the direction A shown in FIG. 1. The motor 134 is mounted on a drive control circuit board 136 in charge of driving control of the motor 134. The drive control circuit board 136 is supported by unshown supports formed at the bottom of the housing 200.

The optical beams focused at the position in the vicinity of the reflecting surface of the polygon mirror 132 are dynamically deflected toward a first lens group 140. Since the optical beams have been incident upon the position in the vicinity of the reflecting surface at different incident angles, after intersecting at the position and being dynamically deflected by the reflecting surface, the optical beams travel separating from the optical axis O of the first lens group 140 in the auxiliary scanning direction (see FIG. 2) while overlapping with one another in the main scanning direction. In FIG. 2, the dynamically deflected optical beams are shown with reference characters LY, LM, LC and LK from above. The first lens group 140 is supported by unshown supports formed on side panels of the housing 200.

The dynamically deflected optical beams LY, LM, LC and LK (which once focused at the position in the vicinity of the reflecting surface of the polygon mirror 132) travel to the photoconductive drums 300Y, 300M, 300C and 300K via an imaging optical system including the first lens group 140, adjustment mirrors 154Y, 154M, 154C and 154K placed on their optical paths, and second lens groups 160Y, 160M, 160C and 160K placed on their optical paths, and thereafter focus on the surfaces of the photoconductive drums 300Y, 300M, 300C and 300K respectively being scanned in the main scanning direction at a constant speed.

The first lens group 140 may be implemented by, for example, an fθ lens having fθ characteristics. Each second lens group 160Y, 160M, 160C, 160K may be implemented by, for example, a cylindrical lens having refractive power for converging the optical beam in the auxiliary scanning direction. Incidentally, since the focusing position of each optical beam LY, LM, LC, LK in the vicinity of the reflecting surface of the polygon mirror 132 (the aforementioned "position" in the vicinity of the reflecting surface) is in a "conjugate relationship", in the auxiliary scanning direction, with the focusing position of the optical beam on the photoconductive drum 300Y, 300M, 300C, 300K, optical face angle error at the polygon mirror 132 is corrected properly. Thus, regardless of which reflecting surface of the polygon mirror 132 reflects the optical beams, each optical beam LY, LM, LC, LK is scanned on each photoconductive drum 300Y, 300M, 300C, 300K in the main scanning direction straightly.

In tandem multibeam scanning device according to the embodiment, only one polygon mirror is employed, and the adjustment mirrors (154Y, 154M, 154C and 154K) are placed between the first-lens group and the second lens groups in order to achieve a proper optical path length of each optical beam.

Further, an unshown reflection mirror is placed in each marginal scan range (inside the whole scan range of each optical beam on each scan target surface and outside an actual scan range used for actual drawing of the image) in order to catch the scanned optical beam at the end of each main scan. Each scanned optical beam LY, LM, LC, LK emerging from the second lens group 160Y, 160M, 160C, 160K is caught by the reflection mirror and reflected toward a sensor unit 180.

The sensor unit 180 has photoreceptors for receiving the optical beams. Each photoreceptor, held by an unshown support formed on a side panel of the housing 200, is placed at a position that is equivalent to each scan target surface via the reflection mirror. A light blocking plate is placed in front of the photosensitive surface of each photoreceptor in order to let the photoreceptor output an electric signal when the scanned optical beam reaches a prescribed position outside the aforementioned actual scan range. By detecting a rising edge of the output signal from the photoreceptor, arrival of each scanned optical beam to the prescribed position outside the actual scan range is detected. In short, the photoreceptors are provided to the sensor unit 180 as sensors for horizontal synchronization.

The optical beams LY, LM, LC and LK dynamically deflected by the polygon mirror 132 are first incident upon the first lens group 140 as mentioned above. The optical beams enter and travel in different positions of the first lens group 140. Specifically, the optical beams LY, LM, LC and LK incident upon the first lens group 140 are in parallel with the optical axis O of the first lens group 140 in the main scanning direction while being at different angles with respect to the optical axis O in the auxiliary scanning direction. All the optical beams LY, LM, LC and LK pass through the first lens group 140 off the optical axis O and travel in directions gradually separating from the optical axis O. Thus, the optical beams emerge from the first lens group 140 accompanied by different scan curvature errors.

The optical beams LY, LM LC emerging from the first lens group 140 travel to deflection mirrors 152 (152Y, 152M, 152C) and adjustment mirrors 154 (154Y, 154M, 154C) which are placed on their optical paths, respectively. The optical beam LK emerging from the first lens group 140 travels to the adjustment mirror 154 (154K) which is placed on its optical path.

Next, the propagation of the optical beam LY will be explained first. The optical beam LY emerging from the first lens group 140 is reflected by a deflection mirror 152Y, further reflected by an adjustment mirror 154Y, and then incident upon the second lens group 160Y. The second lens group 160Y has refractive power for converging the optical beam LY in the auxiliary scanning direction as mentioned above. The second lens group 160Y also has functions for correcting aberrations such as fθ characteristics errors and curvature of field in the main scanning direction. The second lens group 160Y corrects the scan curvature error of the optical beam LY (caused by the propagation of the optical beam LY in the first lens group 140 at a different angle from the optical axis O) by being placed with its reference axis parallelly shifted from the optical axis of the optical beam LY in the auxiliary scanning direction. Specifically, the optical beam LY is incident upon the second lens group 160Y in parallel with the reference axis of the second lens group 160Y at an incident point that is a prescribed distance shifted from the reference axis in the auxiliary scanning direction.

The adjustment mirror 154Y has a function for correcting a tilt of the scan line of the optical beam LY on the photoconductive drum 300Y in the auxiliary scanning direction F. Specifically, when the adjustment mirror 154Y rotates in the direction B shown in FIG. 2, the tilt of the scan line of the optical beam LY on the photoconductive drum 300Y in the auxiliary scanning direction F changes. Thus, the tilt of the scan line in the auxiliary scanning direction F can be corrected by properly rotating the adjustment mirror 154Y. The optical beam LY adjusted as above is scanned on the photoconductive drum 300Y.

The optical beam LM emerging from the first lens group 140 is reflected by a deflection mirror 152M, further reflected by an adjustment mirror 154M, and then incident upon the second lens group 160M. The second lens group 160M, having functions similar to those of the second lens group 160Y, corrects the scan curvature error of the optical beam LM (caused by the propagation of the optical beam LM in the first lens group 140 at a different angle from the optical axis O) by being placed with its reference axis parallelly shifted from the optical axis of the optical beam LM in the auxiliary scanning direction. Specifically, the optical beam LM is incident upon the second lens group 160M in parallel with the reference axis of the second lens group 160M at an incident point that is a prescribed distance shifted from the reference axis in the auxiliary scanning direction. The adjustment mirror 154M is capable of correcting a tilt of the scan line of the optical beam LM on the photoconductive drum 300M in the auxiliary scanning direction G, by being rotated in the direction C shown in FIG. 2. The optical beam LM adjusted as above is scanned on the photoconductive drum 300M. Incidentally, the optical beam LM passes through the first lens group 140 on its optical path that is nearer to the optical axis O than the optical beam LY, therefore, the scan curvature error of the optical beam LM is smaller than that of the optical beam LY, and the shift width of the optical beam LM from the reference axis of the second lens group 160M may be smaller than that of the optical beam LY.

The optical beam LC emerging from the first lens group 140 is reflected by a deflection mirror 152C, further reflected by an adjustment mirror 154C, and then incident upon the second lens group 160C. The second lens group 160C, also having functions similar to those of the second lens group 160Y, corrects the scan curvature error of the optical beam LC (caused by the propagation of the optical beam LC in the first lens group 140 at a different angle from the optical axis O) by being placed with its reference axis parallelly shifted from the optical axis of the optical beam LC in the auxiliary scanning direction. Specifically, the optical beam LC is incident upon the second lens group 160C in parallel with the reference axis of the second lens group 160C at an incident point that is a prescribed distance shifted from the reference axis in the auxiliary scanning direction. The adjustment mirror 154C is capable of correcting a tilt of the scan line of the optical beam LC on the photoconductive drum 300C in the auxiliary scanning direction H, by being rotated in the direction D shown in FIG. 2. The optical beam LC adjusted as above is scanned on the photoconductive drum 300C. Incidentally, the optical beam LC passes through the first lens group 140 on its optical path nearer to the optical axis O than the optical beam LY, therefore, the scan curvature error of the optical beam LC is smaller than that of the optical beam LY, and the shift width of the optical beam LC from the reference axis of the second lens group 160C may be smaller than that of the optical beam LY.

The optical beam LK emerging from the first lens group 140 is reflected by an adjustment mirror 154K and then incident upon the second lens group 160K (There is no deflection mirror for the optical beam LK.). The second lens group 160K, also having functions similar to those of the second lens group 160Y, corrects the scan curvature error of the optical beam LK (caused by the propagation of the optical beam LK in the first lens group 140 at a different angle from the optical axis O) by being placed with its reference axis parallelly shifted from the optical axis of the optical beam LK in the auxiliary scanning direction. Specifically, the optical beam LK is incident upon the second lens group 160K in parallel with the reference axis of the second lens group 160K at an incident point that is a prescribed distance shifted from the reference axis in the auxiliary scanning direction. The adjustment mirror 154K is capable of correcting a tilt of the scan line of the optical beam LK on the photoconductive drum 300K in the auxiliary scanning direction I, by being rotated in the direction E shown in FIG. 2. The optical beam LK adjusted as above is scanned on the photoconductive drum 300K.

However, if the angle of the adjustment mirror 154 (154Y, 154M, 154C, 154K) is adjusted in order to correct the tilt of the scan line occurring on the scan target surface (photoconductive drum 300) in the auxiliary scanning direction, the optical path of the optical beam after being deflected by the adjustment mirror 154 changes from that before the angle adjustment, by which the incident angle of the optical beam onto the second lens group 160 (160Y, 160M, 160C, 160K) changes, the shift width of the incident optical beam from the reference axis of the second lens group 160 changes, the optical path length of the optical beam until reaching the scan target surface changes, and consequently, the "bow" is formed on the scan target surface. In other words, if the angle of the adjustment mirror 154 placed between the first lens group 140 and the second lens group 160 is changed, the optical path of the optical beam changes in the auxiliary scanning direction, and thereby the scan curvature error caused by the first lens group 140 (which has already been corrected by the second lens group 160) revives, by which the bow revives on the scan target surface. The phenomenon is common to all the optical beams LY, LM, LC and LK.

Figure 3:
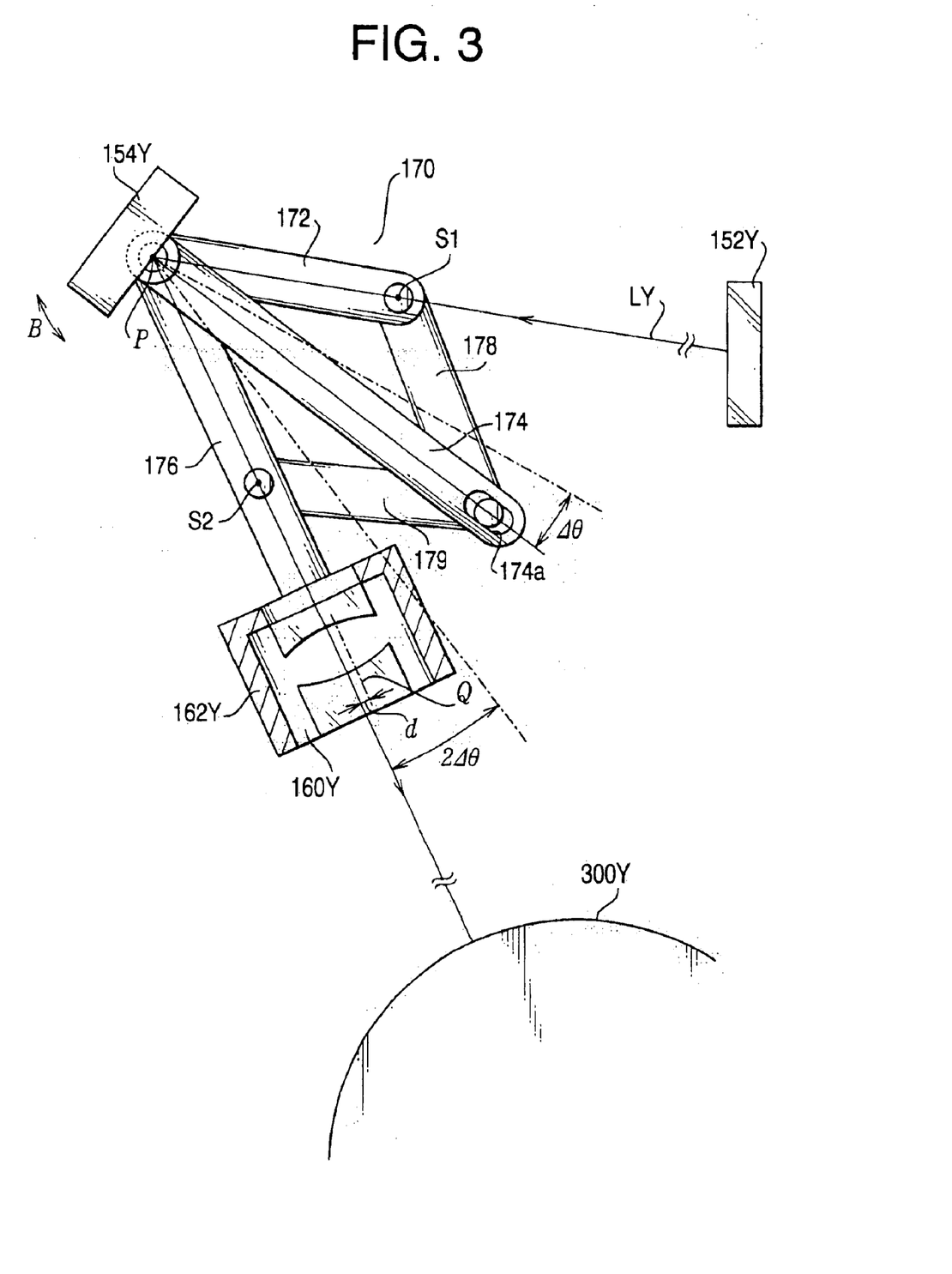
FIG. 3 is a schematic diagram showing detailed structure around an adjustment mirror and a second lens group of the multibeam scanning device of the embodiment.

FIG. 3 is a schematic diagram showing detailed structure around the adjustment mirror 154Y and the second lens group 160Y. The adjustment mirror 154Y is supported rotatably by an unshown support that is formed on a side panel of the housing 200. The adjustment mirror 154Y and the second lens group 160Y are connected together by an isosceles link 170 so as to move in conjunction with each other. The other adjustment mirrors 154 (154M, 154C, 154K) and second lens groups 160 (160M, 160C, 160K) placed on optical paths of other optical beams (LM, LC, LK) are also held by structure (with the isosceles link 170) similar to the that shown in FIG. 3, and thus repeated description thereof is omitted for brevity.

The isosceles link 170 is mainly composed of a fixed bar 172, a center bar 174, a connection bar 176, and slide bars 178 and 179. When the adjustment mirror 154Y is rotated in the direction B around its supporting point P by an angle θ, the isosceles link 170 rotates the second lens group 160Y in the direction B around the supporting point P by 2θ in conjunction with the adjustment mirror 154Y.

The fixed bar 172 of the isosceles link 170 is supported by the unshown support that is formed on the side panel of the housing 200. An end of the fixed bar 172 supports the supporting point P and the other end rotatably supports the proximal end of the slide bar 178 at point S1. In the embodiment, a line connecting the points P and S1 is parallel with the axis of the beam LY which is reflected by the deflection mirror 152Y and directed to the adjustment mirror 154Y. An end of the center bar 174 to which the adjustment mirror 154Y is fixed is rotatably connected to the supporting point P, and the other end of the center bar 174 having a long groove 174a supports distal ends of the slide bars 178 and 179. Specifically, the distal ends of the slide bars 178 and 179 are rotatably connected with a pin 174P, which is slidably supported in the groove 174a. With this structure, the pin 174P being movable in the longitudinal axial direction of the center bar 174, and is prevented from moving in a direction transverse to the longitudinal axis of the center bar 174. One end of the connection bar 176 is supported by the supporting point P while the other end is fixed to a support frame 162Y which supports the second lens group 160Y. The connection bar 176 also supports the proximal end of the slide bar 179 at its intermediate point S2. The slide bars 178 and 179 are formed to have the same length. The length of the fixed bar 172 between the supporting point P and the other end (supporting the proximal end of the slide bar 178) S1 is the same as the length of part of the connection bar 176 between the supporting point P and the intermediate point (supporting the proximal end of the slide bar 179) S2. By the composition of the isosceles link 170, when the center bar 174 is rotated around the supporting point P by an angle Δθ, the connection bar 176 and the second lens group 160Y rotate by 2Δθ. The action and functions of the isosceles link 170 will be explained below.

If the adjustment mirror 154Y is rotated in the direction B around the supporting point P by Δθ in order to correct the tilt of the scan line of the optical beam LY on the photoconductive drum 300Y in the auxiliary scanning direction F, the center bar 174 (fixed to the adjustment mirror 154Y) also rotates in the direction B around the supporting point P by Δθ. When the center bar 174 rotates by Δθ, distal ends of the slide bars 178 and 179 engaged with the long groove 174a of the center bar 174 slide in a direction orthogonal to the reflecting surface of the adjustment mirror 154Y. In this process, the angle between the fixed bar 172 and the center bar 174 changes by Δθ, and the angle between the center bar 174 and the connection bar 176 also changes by Δθ. Therefore, the angle between the fixed bar 172 and the connection bar 176 changes by 2Δθ, that is, the connection bar 176 rotates in the direction B around the supporting point P by 2Δθ.

The supporting point P, functioning as rotation axes of the adjustment mirror 154Y (and the center bar 174) and the connection bar 176, coincides with the deflection point of the optical beam LY on the adjustment mirror 154Y (when seen in the direction of FIG. 3). Therefore, when the adjustment mirror 154Y is rotated by Δθ, the optical path of the optical beam LY after being deflected by the adjustment mirror 154Y is rotated in the direction B around the supporting point P by 2Δθ and is oriented toward the second lens group 160Y. The second lens group 160Y is fixed to the connection bar 176 via the support frame 162Y, and thus the position of the optical path of the optical beam LY relative to the second lens group 160Y does not change even if the adjustment mirror 154Y is rotated. In other words, the optical beam LY is incident upon a prescribed position on the second lens group 160Y (second imaging optical system) regardless of the rotation of the adjustment mirror 154Y. Incidentally, the prescribed position means the position that is a prescribed distance d shifted from the reference axis Q of the second lens group 160Y in the auxiliary scanning direction (eccentricity d for correcting the aforementioned scan curvature error occurring at the first lens group 140) where the optical beam LY is incident in parallel with the reference axis Q.

As above, the optical beam LY is incident upon the prescribed position on the second imaging optical system (second lens group 160Y) regardless of the rotation of the adjustment mirror 154Y, by which the eccentricity d of the optical beam LY from the reference axis Q of the second lens group 160Y is maintained constant. Further, since the rotation axis of the adjustment mirror 154Y coincides with the rotation axis of the second lens group 160Y, the distance between the adjustment mirror 154Y and the second lens group 160Y is also maintained constant. In addition, since the deflection point of the optical beam LY on the adjustment mirror 154Y, the rotation axis of the adjustment mirror 154Y and the rotation axis of the second lens group 160Y coincide with one another, the optical beam LY is incident upon the second lens group 160Y constantly in parallel with the reference axis Q of the second lens group 160Y. Therefore, the second lens group 160Y is constantly maintained in a proper state satisfactorily correcting the scan curvature error occurring at the first lens group 140. No scan curvature error is caused by the angle adjustment of the adjustment mirror 154Y. Therefore, the tilt of scan lines on each scan target surface in the auxiliary scanning direction can be corrected easily, by which the misregistration of images occurring in the color superposition can be eliminated and thereby a sharp and clear color image with precise and natural colors can be obtained.

Figure 4:
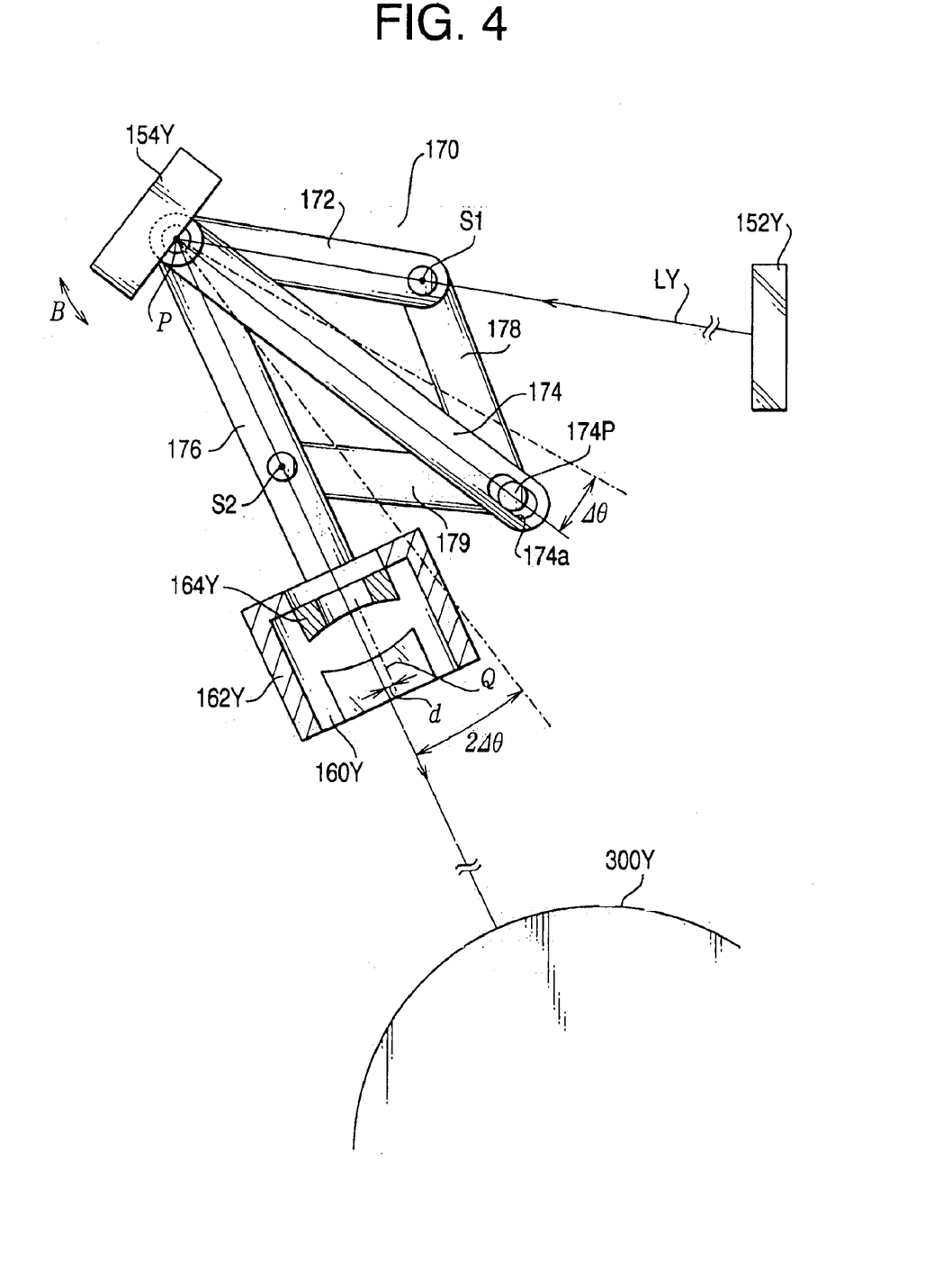
FIG. 4 is a schematic diagram showing detailed structure around an adjustment mirror and a second lens group of a multibeam scanning device in accordance with another embodiment of the present invention.

FIG. 4 is a schematic diagram showing detailed structure around a adjustment mirror 154Y and a second lens group 160Y of a multibeam scanning device in accordance with a second embodiment of the present invention, wherein elements already shown in FIGS. 1 through 3 (first embodiment) are indicated with the same reference characters and repeated description thereof is omitted for brevity.

In the multibeam scanning device of the second embodiment, the incident side of the second lens group 160Y is provided with an aperture unit 164Y. The aperture unit 164Y has an opening extending in the main scanning direction. The opening of the aperture unit 164Y has a function for restricting and regulating the scan range and the shape of the beam spot on the photoconductive drum 300Y to some extent, by which deterioration of image quality caused by stray light is prevented. The profile (vertical cross section) of the second lens group 160Y containing the reference axis Q has a shape with concavities on both sides (incident side and emitting side), and the aperture unit 164Y is securely fit in the concavity on the incident side of the second lens group 160Y.

Since the aperture unit 164Y is securely fit and fixed in the second lens group 160Y, the positional relationship between the optical path of the optical beam LY and the opening of the aperture unit 164Y is maintained constant regardless of the rotation of the adjustment mirror 154Y. Therefore, the opening of the aperture unit 164Y is constantly allowed to properly regulate the scan range and spot form of the optical beam LY even if the adjustment mirror 154Y is rotated and the optical path of the optical beam LY changed.

Incidentally, the aperture unit 164Y may also be fit in the concavity on the emitting side of the second lens group 160Y so as to regulate the scan range and spot form of the optical beam LY after being shaped by the second lens group 160Y.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

The present disclosure relates to the subject matter contained in Japanese Patent Application No. 2003-082079, filed on Mar. 25, 2003, which is expressly incorporated herein by reference in its entirety.

What is claimed is:

1. A multibeam scanning device that dynamically deflects a plurality of light beams emitted by a light source, the dynamically deflected optical beams being scanned on target surfaces, respectively, comprising:

a deflecting system that deflects the plurality of beams emitted by the light source in a main scanning direction, the plurality of beams being aligned in the main scanning direction;

a first imaging optical system upon which all the optical beams dynamically deflected by the deflecting system are incident;

a plurality of optical path deflection units each of which deflects the optical path of each of the optical beams that passed through the first imaging optical system, each of the plurality of optical path deflection units being rotatable in the auxiliary scanning direction that is orthogonal to the main scanning direction;

a plurality of second imaging optical systems, the plurality of beams deflected by the optical path deflection units being incident on the plurality of second imaging optical systems, respectively, the beams passed through the second imaging optical systems being converged on the plurality of target surfaces, respectively; and a position adjusting system which adjusts a position of each of the plurality of second imaging optical systems so that the positional relationship of the second imaging optical system with respect to the beam incident thereon is maintained.

2. The multibeam scanning device according to claim 1, wherein the position adjusting system includes a plurality of moving mechanisms that move the plurality of second imaging optical systems in association with rotation of the plurality of optical path deflection units, respectively.

3. The multibeam scanning device according to claim 2, wherein each of the moving mechanisms moves each of the second imaging optical systems in conjunction with the corresponding optical path deflection unit maintaining a constant distance with respect to the corresponding optical path deflection unit.

4. The multibeam scanning device according to claim 3, wherein the moving mechanisms include link systems which connect the second imaging optical systems with the corresponding optical path deflection units so that the plurality of second imaging optical systems move according to rotation of the optical path deflection units, respectively.

5. The multibeam scanning device according to claim 4, wherein the link system is formed to let the second imaging optical system rotate around the corresponding optical path deflection unit by twice rotation angle of the corresponding optical path deflection unit.

6. The multibeam scanning device according to claim 5, wherein each of the moving mechanisms is configured such that a deflection point of the optical beam on the optical path deflection unit, a rotation axis of the optical path deflection unit, and a rotation axis of the corresponding second imaging optical system coincide with one another.

7. The multibeam scanning device according to claim 1, further comprising a plurality of aperture units corresponding to the second imaging optical systems, each of the plurality of aperture units regulating and specifying a shape of a beam spot formed on each of the scan target surfaces, the aperture units being placed so as not to move relative to the corresponding second imaging optical system.

8. The multibeam scanning device according to claim 7,
   wherein each of the second imaging optical systems has a concavity on its beam incident side, and
   wherein each of the aperture units is fitted in the concavity of the corresponding second imaging optical system.

9. The multibeam scanning device according to claim 1, wherein the first imaging optical system includes an fθ lens.

10. The multibeam scanning device according to claim 1, wherein each of the second imaging optical systems includes an optical system having refracting power to converge the optical beam in the auxiliary scanning direction.

11. The multibeam scanning device according to claim 1,
   wherein the plurality of second imaging optical systems are configured to compensate for aberration caused by the first imaging system for the plurality of beams when predetermined positional relationships with respect to the plurality of beams are maintained, and
   wherein the position adjusting system adjusts a position of each of the plurality of second imaging optical systems so that the predetermined positional relationship of the second imaging optical system with respect to the beam incident thereon is maintained.

12. A multibeam scanning device that dynamically deflects a plurality of light beams emitted by a light source, the dynamically deflected optical beams being scanned on target surfaces, respectively, comprising:
   a deflecting system that deflects the plurality of beams emitted by the light source in a main scanning direction, the plurality of beams being aligned in the main scanning direction;
   a first imaging optical system upon which all the optical beams dynamically deflected by the deflecting system are incident;
   a plurality of optical path deflection units each of which deflects the optical path of each of the optical beams that passed through the first imaging optical system in the auxiliary scanning direction that is orthogonal to the main scanning direction, a direction in which each of the plurality of beams is deflected being changeable;
   a plurality of second imaging optical systems, the plurality of beams deflected by the optical path deflection units being incident on the plurality of second imaging optical systems, respectively, the beams passed through the second imaging optical systems being converged on the plurality of target surfaces, respectively; and
   a position adjusting system which adjusts a position of each of the plurality of second imaging optical systems so that the positional relationship of the second imaging optical system with respect to the beam incident thereon is maintained.

13. A multibeam scanning device that dynamically deflects a plurality of light beams emitted by a light source, the dynamically deflected optical beams being scanned on target surfaces, respectively, comprising:
   first deflection means for deflecting the plurality of beams emitted by the light source in a main scanning direction, the plurality of beams being aligned in the main scanning direction;
   a first imaging optical system upon which all the optical beams dynamically deflected by the first deflection means are incident;
   a plurality of second deflection means for deflecting the optical paths of the optical beams that passed through the first imaging optical system individually in the auxiliary scanning direction that is orthogonal to the main scanning direction, directions in which the plurality of beams are deflected being changeable;
   a plurality of second imaging optical systems, the plurality of beams deflected by the second deflection means being incident on the plurality of second imaging optical systems, respectively, the beams passed through the second imaging optical systems being converged on the plurality of target surfaces, respectively; and
   adjusting means for adjusting positions of each of the plurality of second imaging optical systems so that the positional relationships of the plurality of second imaging optical systems with respect to the beams incident thereon are maintained, respectively.

* * * * *